Patented Sept. 26, 1950

2,523,621

UNITED STATES PATENT OFFICE 2,523,621

α - PHENYLACETAMIDO-β,β-DIALKOXYPROPIONIC ACID AND METHOD FOR PREPARING SAME

Stanton A. Harris, Westfield, and Glen E. Arth and Carl H. Hoffman, Rahway, and Karl Folkers, Plainfield, N. J., assignors to Merck & Co., Inc., Rahway, N. J., a corporation of New Jersey No Drawing. Original application December 21, 1945, Serial No. 636,516. Divided and this application September 8, 1948, Serial No. 48,334

5 Claims. (Cl. 260—471)

This invention relates to certain new chemical compounds and to improved processes of preparing them from readily available starting materials. More particularly, it relates to certain new chemical compounds, α-phenylacetamido-β,β-dialkoxy-propionic acid and alkyl esters thereof. These compounds, which may be prepared from available starting materials, have value in the synthesis of penicillin and compounds possessing penicillin-like activity.

This application is a division of my co-pending application Serial No. 636,516, filed December 21, 1945, now U. S. Patent 2,489,881.

In preparing our new chemical compounds we may start with the methyl ester of α-formyl-α-phenacetamido acetic acid, sodium salt, prepared as described in the following examples which are intended to be illustrative, but not restrictive, of our invention.

EXAMPLE 1

Methyl penaldate G

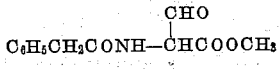

Preparation of α-formyl-α-phenacetamido acetic acid methyl ester, sodium salt

A suspension of .25 mole of freshly prepared sodium methoxide, free from methyl alcohol, was made in ca. 50 ml. dry benzene. To this suspension was added a solution of 18 grams of methyl formate (0.3 mole; 20% excess) and about two-thirds of 52 grams (.25 mole) of phenacetamidoacetic acid methyl ester in 350 ml. dry benzene with thorough stirring. The remainder of the ester was added as a solid. Reaction began almost immediately; a yellow to orange coloration developed and a precipitated oil began to appear within ten to fifteen minutes from the beginning of addition of the ester. Stirring was continued for six hours, and the mixture then allowed to stand overnight. The crude semi-solid may be used in the following steps after decanting the benzene. However, the sodium salt can be solidified and granulated by stirring with a nearly equal volume of ethyl ether, as shown in later experiments, to yield 45–50 grams of crude salt when dried.

The methyl formate used was Eastman Kodak reagent grade, dried over anhydrous potassium carbonate. It had been found to be acid previously. A Hershberg stirrer was used. Addition was quite rapid; time consumed was about fifteen minutes.

EXAMPLE 2

Dinitrophenylhydrazone of methyl penaldate G

A solution of 2.5 N sodium methoxide was prepared by dissolving 5.75 g. sodium in methanol and diluting the product to 100 ml. in a volumetric flask. Eight milliliters of this solution was evaporated to a sludge under reduced pressure. Toluene (15 ml.) was added and the suspension again evaporated to a solid. This solid was then covered with ether (about 50 ml.) and 1.25 g. (0.02 mole) methyl formate added. Phenacetyl glycine methyl ester (4.14 g., 0.02 mole) was then added. The mixture was shaken and a yellow viscous oil separated. After standing for an hour or so, the oil became more viscous. Part of this viscous material was dissolved in water and acidified with a hydrochloric acid solution containing 2,4-dinitrophenylhydrazine. A yellow 2,4-dinitrophenylhydrazone separated which melted 140–160° C. when recrystallized from methanol. After two more recrystallizations from methanol, the product melted at 180–181° C. (Softens 177°.) This product did not depress the melting point of a 2,4-dinitrophenylhydrazone obtained from penicillin.

Partial analysis gave the following:

Calcd. for $C_{18}H_{17}N_5O_7$: C, 52.04; H, 4.13; N, 16.86. Found: C, 51.85; H, 3.98; N, 17.19; 16.66; 17.23.

EXAMPLE 3

Methyl-α-phenylacetamido-β,β-dimethoxypropionate (methyl penaldate G dimethylacetal)

A quantity of 129 grams of methyl-α-formyl-α-phenacetamido acetate sodium salt was dissolved in 750 ml. of water. The water solution was extracted three times with 50-ml. portions of chloroform, which were discarded. The water layer was made thoroughly acid to Congo paper by additions of 50% sulfuric acid and extraction with one portion of chloroform carried on simultaneously. Four more portions were used, the chloroform layers combined and dried over anhydrous sodium sulfate and concentrated. After final removal of the solvent under vacuum pump, the residue (light brown oil) of crude formyl ester weighed 34.4 gms.

This oily ester was treated with 150 ml. of dry methanol in which approximately 5 g. of dry hydrogen chloride gas had been dissolved. After shaking for a time to put in solution, it was allowed to stand at room temperature for one hour. The methanol was then concentrated down to about one-third original volume, 100 ml. of chloroform added to the cooled residue and this solution shaken with a half liter of water, which was extracted four more times with a little chloroform. The combined chloroform extracts were shaken once more with water, then with water containing enough sodium bicarbonate to remain basic (added as needed). The chloroform layer was dried over anhydrous sodium sulfate and concentrated. The residue of crude acetal ester was 22.5 grams after final drying under high vacuum to a viscous brown oil.

EXAMPLE 4

α-Phenylacetamido-β,β-dimethoxypropionic acid (penaldic G acid, dimethylacetal)

This material was treated with 88 ml. of normal sodium hydroxide (1 equivalent) and enough methanol added to put the oil into solution. This solution is allowed to stand at room temperature one and one-half hours; it is then concentrated down to about one-third its original volume, diluted with 250 ml. of water, and the solution extracted three times with 50-ml. portions of chloroform, which are discarded. The water layer is acidified slowly by addition of 50% sulfuric acid, keeping the solution cool, and simultaneously extracting the precipitated acid with cholorform until further addition of sulfuric acid produces no precipitate in the water layer.

The water layer is extracted four more times with 50-ml. portions of chloroform, and the chloroform layers combined, dried over anhydrous sodium sulfate and concentrated. The residual viscous oil, after final drying, weighed 12.5 grams. This crude acid is dissolved in a 1-1 mixture of ethyl acetate and petroleum ether with refluxing, and treated with 2 to 3 grams of "Darco-G-60" activated carbon which removes some color. To the filtered liquor is added more petroleum ether until incipient cloudiness at room temperature. On standing overnight in the icebox, 2.5 grams of acid melting at 109–111° C. (unc.) deposited.

Partial analysis gave the following:
Calcd. for $C_{13}H_{17}O_5N$: C, 58.42; H, 6.42; N, 5.24.
Found: C, 58.00, 58.11; H, 6.45, 6.26; N, 5.15.

EXAMPLE 5

Benzylamide of α-phenylacetamido-β,β-dimethoxypropionic acid (penaldic G dimethylacetalbenzylamide)

A mixture of one gram of β,β-dimethoxy-α-phenylacetamidopropionic acid, methyl ester and one gram of benzylamine was heated at 120–130° C. for two hours. A small sample of the oily product in ether-petroleum ether deposited crystals when scratched. On cooling, scatching and seeding the reaction mixture in ether, a crystalline solid separated. When recrystallized from methanol, needles separated melting at 164–165° C.

Partial analysis gave the following:
Calcd. for $C_{20}H_{24}N_2O_4$: C, 67.39; H, 6.79; N, 7.86.
Found: C, 67.53, 67.67; H, 6.48, 6.76; N, 8.07.

EXAMPLE 6

β-Methoxy-α-phenylacetamidoacrylic acid

A solution of 1 g. β,β-dimethoxy-α-phenylacetamido propionic acid in 5 ml. acetic anhydride containing three drops of piperidine and 0.2 g. sodium acetate was heated on a steam bath for one-half hour. The cooled reaction mixture was extracted with petroleum ether. The petroleum ether was concentrated to an oil. A small portion of this oil was placed in a sublimer and heated under reduced pressure. The drop which collected on the condenser was scraped into a test tube and treated with ½ milliliter of ether and scratched. Crystals separated. When recrystallized from ethyl acetate, a product was obtained melting at 199–200° C. (uncorr.). Recrystallization did not raise the melting point. (193.5–194.5° corr.)

Partial analysis gave the following:
Calcd. for $C_{12}H_{13}NO_4$: C, 61.28; H, 5.57; N, 5.96.
Found: C, 61.31; H, 5.55; N, 6.24, 6.30.

EXAMPLE 7

2-benzyl-4-methoxymethylene-5(4)-oxazolone

Sixty-six grams of β,β-dimethoxyphenacetamidopropionic acid, M. P. 113–115° C., was placed in a round bottom flask together with 60 ml. of acetic anhydride and the mixture heated on the steam bath. The solid dissolved slowly until a clear light-colored solution was obtained. This solution was heated for ten minutes longer in order to complete the reaction. This additional heating has been found to be necessary, as working up without it gives only unreacted starting material. The reaction mixture was concentrated under reduced pressure in order to remove acetic acid and excess acetic anhydride and then washed with about 200 ml. petroleum ether, which caused the residue to solidify. The resulting solid was recrystallized from a small amount of ethyl acetate using just enough to bring it into solution and filter hot. The crystalline product is filtered off, washed with cold ethyl acetate, and dried immediately by pressing on a porous tile. This final drying prevents the darkening and gumming of the substance due to the pressure of solvent and air. Yield, 33.3 gms. and 60% of theory; M. P. 92–93° C.

Partial analysis gave the following:
Calcd. for $C_{12}H_{11}O_3N$: C, 66.35; H, 5.11; N, 6.45.
Found: C, 66.00, 66.29; H, 4.89, 5.18; N, 6.62.

EXAMPLE 8

2-benzyl-4-hydroxymethylene-5(4)-oxazolone

The solution made from 5.8 gms. of 2-benzyl-4-methoxy-methylene-5(4)-oxazolone, 174 ml. of water, and 11.6 ml. of 2.5 N sodium hydroxide was shaken ice cold for 25–30 minutes. There was a small amount of solid material present which when isolated proved to be unreacted starting material, weight 0.5 gm.

A quantity of 11.6 ml. of 2.5 N hydrochloric acid was then added to the clear filtrate and the precipitate collected, washed with cold water and dried in a vacuum desiccator over phosphoric anhydride. Yield, 4.2 gms., 85% based on material used; M. P. 118–118.5° C. (dec.).

Although this material precipitated from aqueous solution, it is our experience that it can be recrystallized from water only with considerable loss. Material with this melting point, however, had satisfactory analyses for carbon, hydrogen and nitrogen. The melting point of the pure compound is actually higher than the above given figure, values as high as 124–125° C. having been obtained from certain purified samples.

Partial analysis gave the following:

Calcd. for $C_{11}H_9O_3N$: C, 65.02; H, 4.47; N, 6.89. Found: C, 64.74; H, 4.34; N, 6.99.

EXAMPLE 9

*2-benzyl-4-benzylaminomethylene-5(4)-oxazolone*

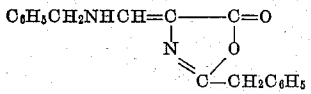

A solution of 50 mg. of 2-benzyl-4-methoxymethyleneoxazolone-4 in ether was treated with one equivalent of benzylamine in ether (total volume of ether, 3 to 4 ml.). A small insoluble precipitate was separated by centrifugation, and the ether solution allowed to stand at room temperature for eighteen hours. After five hours, crystals began to appear. The crystals were washed with ether and recrystallized in square thin plates from ether; M. P. 114–116° C.

Partial analysis gave the following:

Calcd. for $C_{18}H_{16}N_2O_2$: C, 73.96; H, 5.52; N, 9.59. Found: C, 74.60, 73.89; 74.18; H, 5.77, 5.52, 5.40; N, 9.98.

EXAMPLE 10

*Penaldic amide-2,4-dinitrophenylhydrazone*

A suspension of 150 mg. of 2-benzyl-4-methoxymethylene-5(4)-oxazolone in 10 ml. concentrated aqueous ammonia was shaken mechanically overnight at room temperature. Nearly all of the oxazolone had dissolved and the deep yellow color which first appeared had nearly all been discharged. The excess ammonia and water were removed under reduced pressure and dilute hydrochloric acid added until the solution had a pH of 3. This treatment failed to produce a crystalline product so the reaction mixture was treated with an excess of 2,4-dinitrophenylhydrazine and enough ethanol to give complete solution on warming. On scratching and cooling, a yellow flocculent precipitate settled out which melted at 218–219° C. after two recrystallizations from ethanol. This compound did not depress the melting point of a 2,4-dinitrophenylhydrazone obtained from penicillin after its inactivation with ammonia.

Partial analysis gave the following:

Calcd. for $C_{17}H_{16}N_6O_6$: C, 51.00; H, 4.03; N, 20.99. Found: C, 51.31; H, 4.28; N, 21.36.

The chemical reactions occurring may be represented as follows:

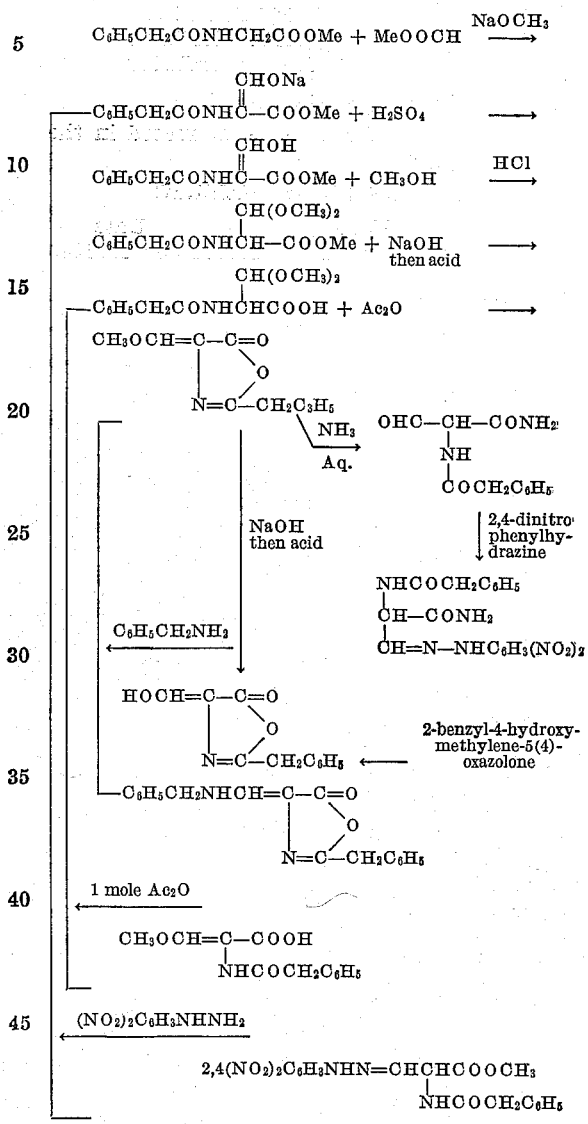

Various changes and modifications may be made in our invention, as described herein, without departing from the scope thereof.

We claim:

1. α-Phenylacetamido -β,β- dimethoxypropionic acid.

2. Methyl-α-phenylacetamido -β,β- dimethoxypropionate.

3. The process that comprises reacting the methyl ester of α-formyl-phenaceturic acid with anhydrous hydrogen chloride in methanol to form the methyl ester of α-phenylacetamido-β,β-dimethoxypropionic acid.

4. The process that comprises reacting the methyl ester of α-phenylacetamido-β,β-dimethoxypropionic acid with aqueous alkali and acidifying the reaction mixture to form α-phenylacetamido-β,β-dimethoxypropionic acid.

5. The process that comprises reacting the methyl ester of α-formylphenaceturic acid with anhydrous hydrogen chloride in methyl alcohol, reacting the resulting ester of α-phenylacetamido-β,β-dimethoxypropionic acid with aqueous alkali and acidifying the reaction mixture to form α-phenylacetamido-β,β-dimethoxypropionic acid.

STANTON A. HARRIS.
GLEN E. ARTH.
CARL H. HOFFMAN.
KARL FOLKERS.

REFERENCES CITED

The following references are of record in the file of this patent:

UNITED STATES PATENTS

| Number | Name | Date |
|---|---|---|
| 2,394,967 | Kushner | Feb. 12, 1946 |

OTHER REFERENCES

Michigan Report, CMR-B-I, Feb. 16, 1944, pages 4 and 5.

Upjohn Report, CMR-U-IV, Mar. 15, 1944, page 6.

Upjohn Report, CMR-U-X, July 10, 1944, page 5.

Squibb Report, CMR-S-IX, Mar. 1, 1944, page 6.